(12) United States Patent
Chen et al.

(10) Patent No.: US 9,388,814 B2
(45) Date of Patent: Jul. 12, 2016

(54) POWER CIRCUIT FOR DIFFERENT FANS

(71) Applicant: ScienBiziP Consulting (Shen Zhen) Co., Ltd., Shenzhen (CN)

(72) Inventors: Guo-Yi Chen, Shenzhen (CN); Kang Wu, Shenzhen (CN); Bo Tian, Shenzhen (CN)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 142 days.

(21) Appl. No.: 14/305,125

(22) Filed: Jun. 16, 2014

(65) Prior Publication Data

US 2014/0368146 A1  Dec. 18, 2014

(30) Foreign Application Priority Data

Jun. 17, 2013  (CN) .......................... 2013 1 0237305

(51) Int. Cl.
*F04D 15/00* (2006.01)
*F04D 27/00* (2006.01)

(52) U.S. Cl.
CPC .......... *F04D 15/0066* (2013.01); *F04D 27/004* (2013.01)

(58) Field of Classification Search
CPC ....... G05F 1/46; G05F 1/462; F24D 15/0066; F24D 27/001; F24D 27/004
See application file for complete search history.

(56) References Cited

U.S. PATENT DOCUMENTS

| 7,683,356 B1* | 3/2010 | Hou .......................... G06F 1/26 250/551 |
| 9,160,162 B2* | 10/2015 | Wu .......................... H02H 3/243 |
| 2014/0178200 A1* | 6/2014 | Huang .................. F04D 27/001 416/39 |
| 2014/0347063 A1* | 11/2014 | Tian ...................... F04D 27/001 324/511 |

* cited by examiner

*Primary Examiner* — Matthew Nguyen
(74) *Attorney, Agent, or Firm* — ScienBiziP, P.C.

(57) ABSTRACT

A power circuit for different types of fans includes first through sixth terminals, a control chip, first through third loads, and a connector. If a 3-pin fan is connected to the connector, only the first load connects the first and second terminals, and a control pin of the connector is idle. If a 4-pin fan is connected to the connector, the second load connects the third and fourth terminals, the third load connects the fifth and sixth terminals, and the first load does not connect the first and second terminals. The control pin receives a divided voltage to control fan speed.

6 Claims, 1 Drawing Sheet

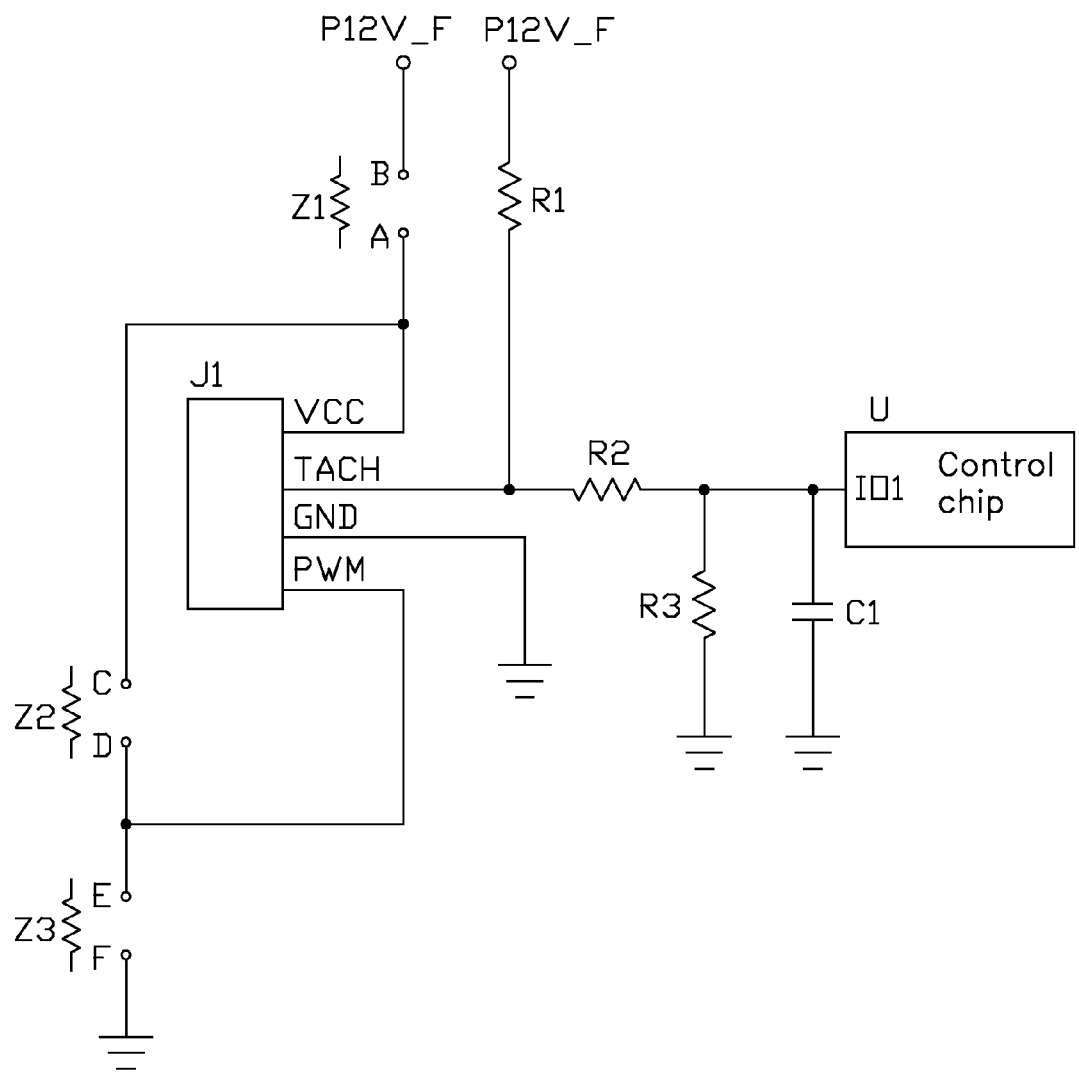

POWER CIRCUIT FOR DIFFERENT FANS

FIELD

The subject matter herein generally relates to a power circuit for different types of fans.

BACKGROUND

Different types of fans require different powering.

BRIEF DESCRIPTION OF THE DRAWINGS

Implementations of the present technology will now be described, by way of example only, with reference to the attached FIGURE, wherein:

The drawing is a circuit diagram of an embodiment of a power circuit.

DETAILED DESCRIPTION

Specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawing is not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a power circuit 10 suitable for different types of fans.

FIG. 1 illustrates a power circuit 10 of the disclosure. The power circuit 10 can comprise a connector J1, a first terminal A, a second terminal B, a third terminal C, a fourth terminal D, a fifth terminal E, a sixth terminal F, a first resistor R1, a second resistor R2, a third resistor R3, a first capacitor C1, a first load Z1, a second load Z2, a third load Z3, and a control chip U.

The connector J1 can comprise a power pin VCC, a signal pin TACH, a ground pin GND, and a control pin PWM.

The first load Z1 is configured to be coupled between the first terminal A and the second terminal B. The second load Z2 is configured to be coupled between the third terminal C and the fourth terminal D. The third load Z3 is configured to be coupled between the fifth terminal E and the sixth terminal F. In the embodiment, the first load Z1, the second load Z2, and the third load Z3 are resistors.

The power pin VCC of the connector J1 is coupled to the first terminal A. The second terminal B is coupled to a power terminal P12V_F, which receives an external direct current voltage. The third terminal C is coupled to the power pin VCC. The fourth terminal D is coupled to the fifth terminal E. The sixth terminal F is coupled to ground.

The signal pin TACH of the connector J1 is coupled to the power terminal P12V_F through the first resistor R1. The signal pin TACH of the connector J1 is coupled to ground through the second resistor R2 and the third resistor R3 in that order. A node between the second resistor R2 and the third resistor R3 is coupled to a signal pin IO1 of the control chip U. The signal pin IO1 of the control chip U is also coupled to ground through the first capacitor C1. The ground pin GND of the connector J1 is coupled to ground. The control pin PWM of the connector J1 is coupled to a node between the fourth terminal D and the fifth terminal E.

When the connector J1 is used to connect a first type of fan, e.g., a 3-pin fan, only the first load Z1 is coupled between the first terminal A and the second terminal B. The power pin VCC of the connector J1 is coupled to the power terminal P12V_F through the first load Z1. The control pin PWM is idle. The control chip U receives a first speed signal of the first type of fan through the signal pin TACH of the connector J1. In the embodiment, the first type of fan has a signal pin, a power pin, and a ground pin. The signal pin, the power pin, and the ground pin of the first type of fan are coupled to the power pin VCC, the signal pin TACH, and the ground pin GND of the connector J1, respectively.

When the connector J1 is used to connect a second type of fan, e.g., a 4-pin fan, the second load Z2 is coupled between the third terminal C and the fourth terminal D, the third load Z3 is coupled between the fifth terminal E and the sixth terminal F. The first load Z1 is not connected to the first and second terminals A, B. The power pin VCC of the connector J1 is coupled to ground through the second load Z2 and the third load Z3 in that order. The control pin PWM of the connector J1 is coupled to ground through the third load Z3. The second type of fan has an internal power source, which supplies a direct current voltage to the power pin VCC of the connector J1. The second type of fan has a signal pin coupled to the signal pin TACH of the connector J1. The control chip U receives a speed signal of the second type of fan through the signal pin TACH of the connector J1. The second load Z2 and the third load Z3 divide the direct current voltage and the control pin PWM receives a divided voltage. The speed of the second type of fan can be adjusted by changing the divided voltage. In the embodiment, the second type of fan has a power pin, a signal pin, a ground pin, and a control pin. The power pin, the signal pin, the ground pin, and the control pin of second type of fan are connected to the power pin VCC, the signal TACH, the ground pin GND, and the control pin PWM of the connector J1, respectively.

In the embodiment, the first through sixth terminals A-F are solder pads disposed on a printed circuit board.

The embodiment shown and described above is only an example. Many details are often found in the art such as the other features of a power circuit. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A power circuit for fans of a first type and a second type, the power circuit comprising:

a first terminal, a second terminal, a third terminal, a fourth terminal, a fifth terminal, a sixth terminal;

a control chip to receive a signal of a fan speed;

a first load configured to be coupled between the first terminal and the second terminal, a second load configured to be coupled between the third terminal and the fourth terminal, and a third load configured to be coupled between the fifth terminal and the sixth terminal; and a connector comprising a power pin, a signal pin, a ground pin, and a control pin, wherein the power pin of the connector is coupled to the first terminal, the second terminal is coupled to an external power terminal, the power pin is coupled to the third terminal, the fourth terminal is coupled to the fifth terminal, the sixth terminal is coupled to ground, the signal pin of the connector is coupled to a signal pin of the control chip, the ground pin of the connector is grounded, the control pin of the connector is coupled to a node between the fourth terminal and the fifth terminal;

on a condition that the connector connects to a first type of fan, only the first load is coupled between the first terminal and the second terminal, the power pin of the connector is coupled to the external power terminal through the first load, the control pin of the connector is idle; and on a condition that the connector connects to a second type of fan, the second load is coupled between the third terminal and the fourth terminal, the third load is coupled between the fifth terminal and the sixth terminal, and the first load does not connect the first and second terminals, the power pin of the connector receives power from an internal power source and is coupled to ground through the second load and the third load in that order, and the control pin of the connector receives a voltage divided by the second and third loads.

2. The power circuit of claim 1, further comprising a first resistor, a second resistor, a third resistor, and a first capacitor, the signal pin of the connector is coupled to the external power terminal through the first resistor, the signal pin of the connector is coupled to ground through the second resistor and the third resistor in that order, a node between the second resistor and the third resistor is coupled to the signal pin of the control chip, and the signal pin of the control chip is coupled to ground through the first capacitor.

3. The power circuit of claim 1, wherein the first load, the second load, and the third load are resistors.

4. The power circuit of claim 1, wherein the first terminal, the second terminal, the third terminal, the fourth terminal, the fifth terminal, and the sixth terminal are solder pads disposed on a printed circuit board.

5. The power circuit of claim 1, wherein the first type of fan has three pins, and the second type of fan has four pins.

6. A power circuit for fans of a first type and a second type, the power circuit comprising:

a first terminal, a second terminal, a third terminal, a fourth terminal, a fifth terminal, a sixth terminal;

a control chip configured to receive a signal indicative of a fan speed;

a first load configured to be coupled between the first terminal and the second terminal, a second load configured to be coupled between the third terminal and the fourth terminal, and a third load configured to be coupled between the fifth terminal and the sixth terminal; and a connector comprising a power pin, a signal pin, a ground pin, and a control pin, wherein the power pin of the connector is coupled to the first terminal, the second terminal is coupled to an external power terminal, the power pin is coupled to the third terminal, the fourth terminal is coupled to the fifth terminal, the sixth terminal is coupled to ground, the signal pin of the connector is coupled to a signal pin of the control chip, the ground pin of the connector is grounded, and the control pin of the connector is coupled to a node between the fourth terminal and the fifth terminal, wherein on a condition that the connector connects to a first type of fan, only the first load is coupled between the first terminal and the second terminal, the power pin of the connector is coupled to the external power terminal through the first load, the control pin of the connector is idle; and on a condition that the connector connects to a second type of fan, the second load is coupled between the third terminal and the fourth terminal, the third load is coupled between the fifth terminal and the sixth terminal, and the first load does not connect the first and second terminals, the power pin of the connector receives power from an internal power source and is coupled to ground through the second load and the third load, in that order, and the control pin of the connector receives a voltage divided by the second and third loads.

* * * * *